Oct. 28, 1952        H. W. HAPMAN         2,615,559
              MATERIAL-REMOVING DEVICE FOR CONVEYERS
Filed Oct. 26, 1946                      3 Sheets-Sheet 1
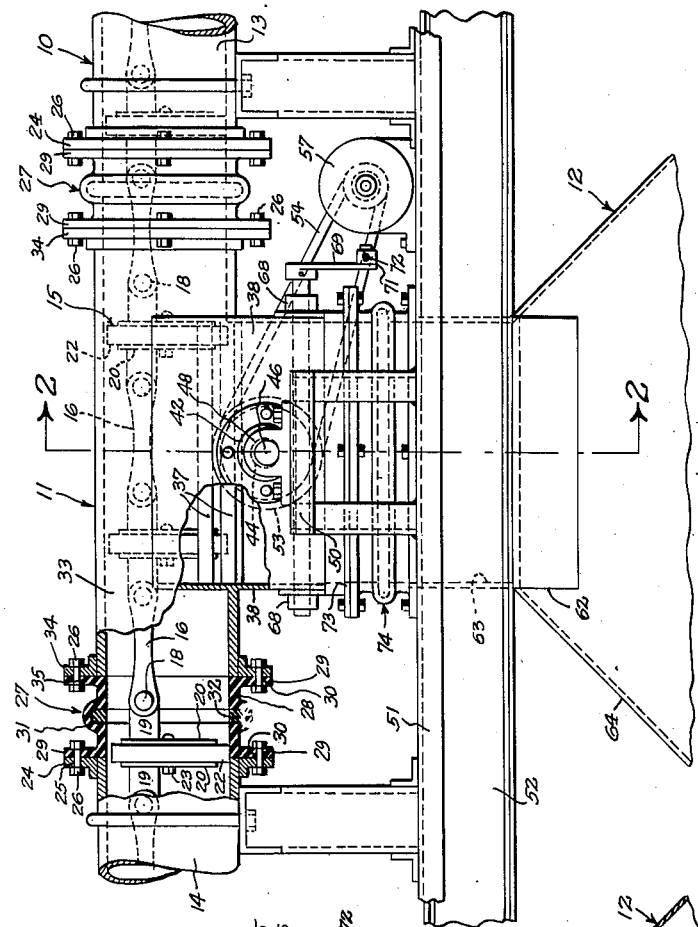
INVENTOR.
Henry W. Hapman
BY Barthel + Bugbee
ATTYS Oct. 28, 1952 H. W. HAPMAN 2,615,559
MATERIAL-REMOVING DEVICE FOR CONVEYERS
Filed Oct. 26, 1946 3 Sheets-Sheet 2
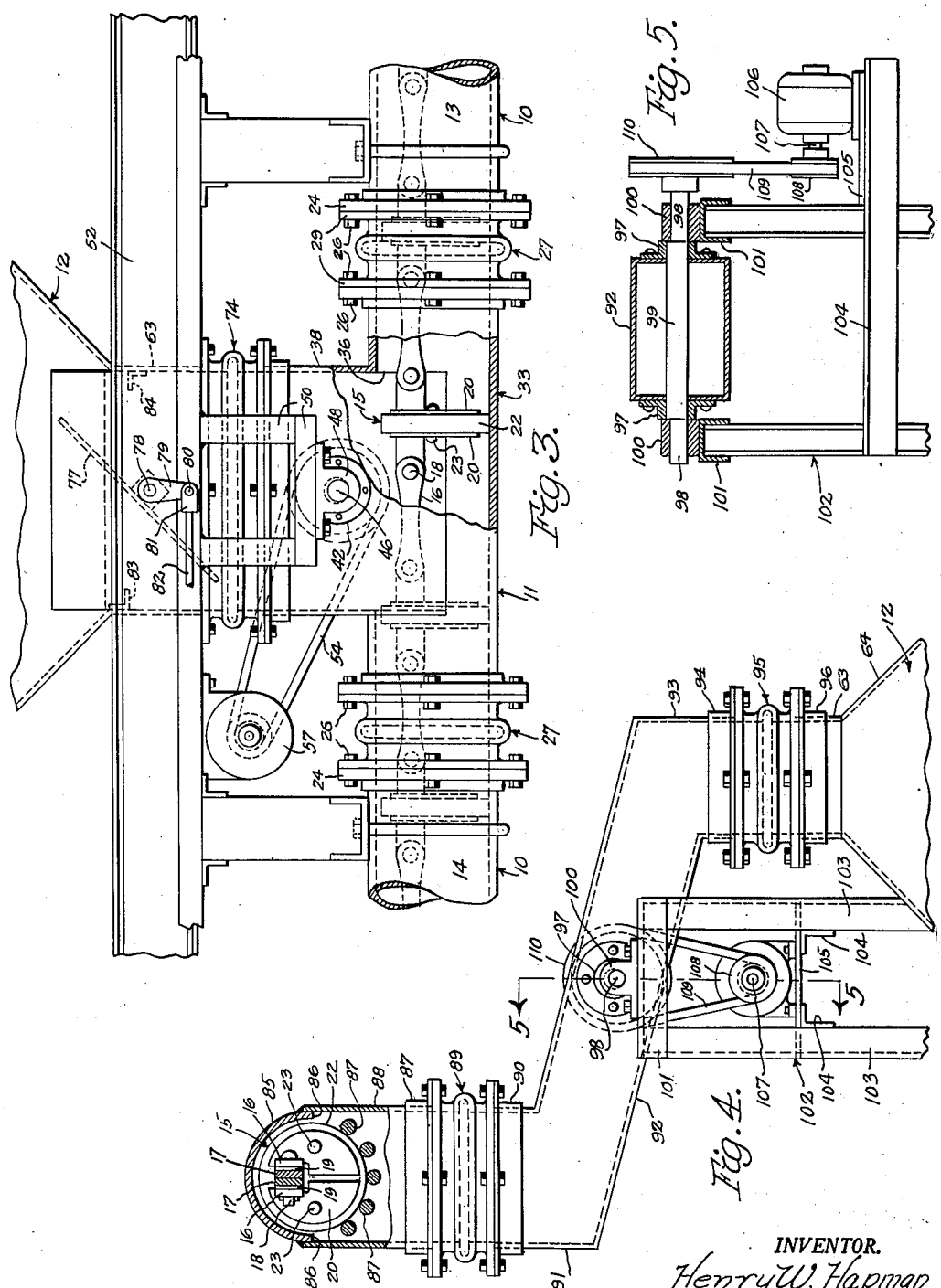
INVENTOR.
Henry W. Hapman
BY Barthel + Bigbee
ATTYS Oct. 28, 1952 H. W. HAPMAN 2,615,559
MATERIAL-REMOVING DEVICE FOR CONVEYERS
Filed Oct. 26, 1946 3 Sheets-Sheet 3
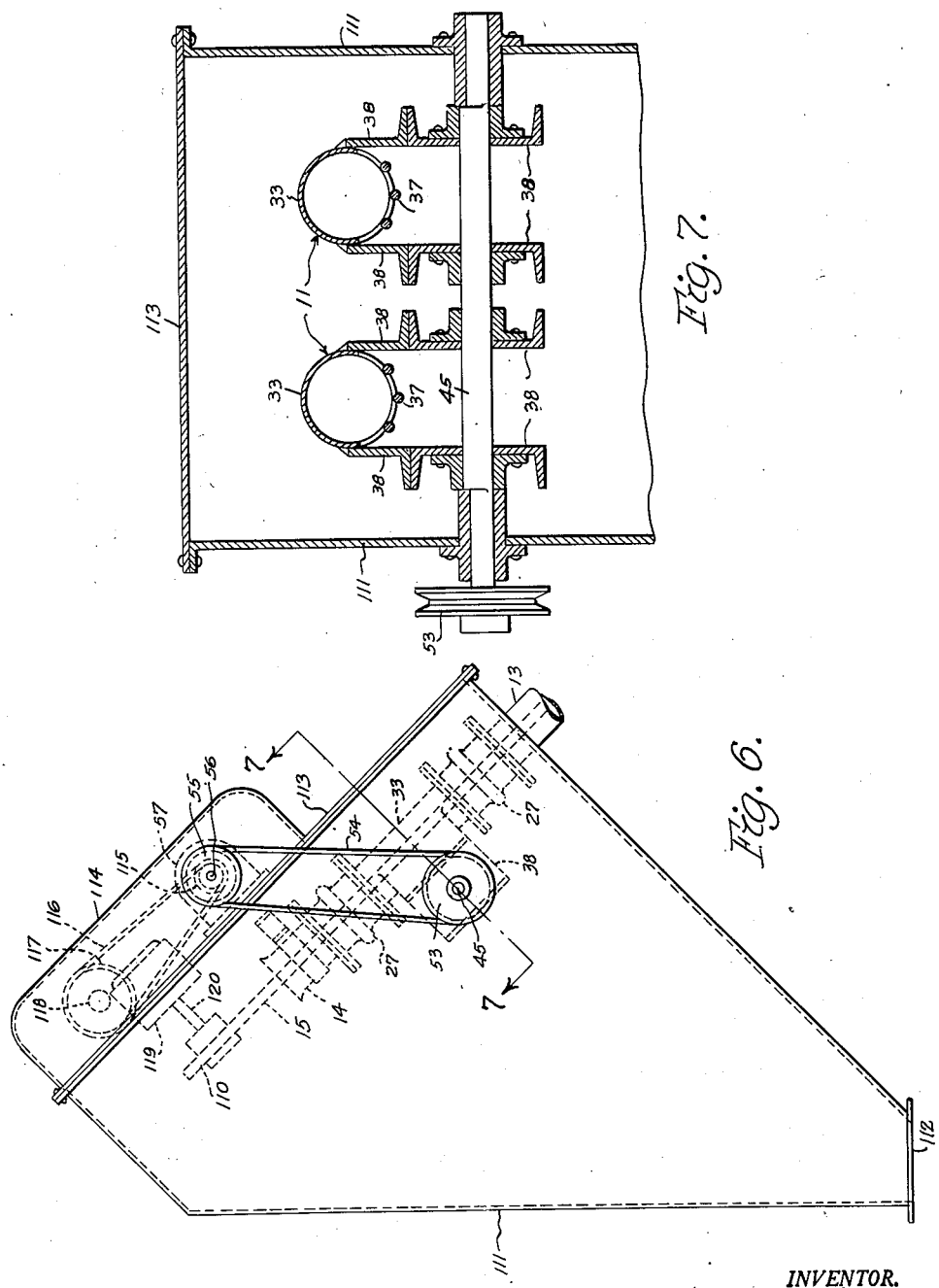

Patented Oct. 28, 1952

2,615,559

UNITED STATES PATENT OFFICE 2,615,559

MATERIAL-REMOVING DEVICE FOR CONVEYERS

Henry W. Hapman, Detroit, Mich., assignor, by mesne assignments, of sixty per cent to Henry W. Hapman and forty per cent to Hannah J. Hapman, both of Detroit, Mich.

Application October 26, 1946, Serial No. 705,942

15 Claims. (Cl. 198—229)

This invention relates to material handling machinery and in particular to conveyors.

One object of this invention is to provide a conveyor having means associated therewith for removing particles of material adhering thereto by shaking them off after the conveyor has discharged the material conveyed.

Another object is to provide a conveyor having a vibrating device associated therewith for shaking the conveyor at its loading or discharge locations so as to remove material adhering to the conveyor and thereby being carried beyond the loading or discharge station.

Another object is to provide a conveyor having a vibrating device associated therewith in combination with a slightly inclined loading or discharge conduit so as to eliminate the need for gates in the conduit by causing the conduit to become self-clogged with the material until it is vibrated to dislodge the material and cause it to load or unload the conveyor as the case may be.

Another object is to provide a conveyor having a vibrating device associated with a portion thereof adjacent one of the sprockets or pulleys supporting or driving the conveyor so as to clear the conveyor chain of adhering particles of material adjacent its point of engagement with the sprocket or pulley.

Another object is to provide a conveyor vibrating mechanism as set forth in the preceding objects wherein a portion of the conveyor conduit is separated from and resiliently connected to the remainder of the conduit by a flexible connection, such as a tube of rubber-like material, the separated portion of the conveyor being connected to a vibrator which shakes the separated conveyor portion and thereby shakes the conveyor as it passes through that portion so as to dislodge any particles of material tending to adhere to the conveyor.

Another object is to provide a conveyor having a vibrating device associated with a portion of the conduit through which the conveyor passes, the vibrating device shaking the conduit, the conveyor and the material in unison so as to prevent or reduce the adhering of material not only to the conveyor but also to the conduit itself, to accelerate the flow of the material and to prevent the building up of material in the conduit or casing attached thereto.

Other objects and advantages of the invention will become apparent during the course of the following description of the accompanying drawings, wherein:

Figure 1 is a side elevation, partly in section, of a conveyor vibrating device according to the invention, as applied to bin loading;

Figure 2 is a vertical section taken along the line 2—2 in Figure 1;

Figure 3 is a side elevation partly in section of a conveyor vibrating device substantially the same as that of Figure 1, but applied to bin discharging;

Figure 4 is a side elevation, with the conveyor in cross-section, of a conveyor vibrating device applied to a self-clogging conduit connected to a conveyor to eliminate the need for conduit gates;

Figure 5 is a vertical section taken along the line 5—5 in Figure 4;

Figure 6 is a side elevation of the end portion of a conveyor with a vibrating device for clearing the conveyor of adhering particles adjacent a conveyor sprocket; and Figure 7 is an inclined section taken along the line 7—7 in Figure 6.

Hitherto, in conveyors and especially flight conveyors, part of the material being conveyed adheres to the conveyor chain and flights after the conveyor passes the discharge station. The particles of material thus adhering to the conveyor flights and chain reach the conveyor sprockets and interfere with their proper operation as well as causing excessive wear not only upon the sprockets and the sprocket shaft bearings, but also upon the take-up mechanism and driving mechanism. The present invention prevents the adhering of material to the conveyor flights and conveyor chain by vibrating or shaking the conveyor as it passes the discharge point, thereby shaking off the particles of material which would otherwise adhere.

*Vibrating bin loading device*

Referring to the drawings in detail, Figure 1 shows a preferred form of a conveyor, generally designated 10, equipped with a vibrating device, generally designated 11, according to a preferred form of the invention, the conveyor being arranged to discharge material into a bin, generally designated 12. The conveyor 10 consists of tubular conduits 13 and 14 connected to the opposite ends of the vibrating device 11, and an endless flight conveyor, generally designated 15 operating in the conduits 13 and 14 and in the vibrating device 11 interconnecting the conduits 13 and 14. The conduits 13 and 14 form continuations of a circuitous conduit system with which the present invention is not generally concerned. The conveyor 15 consists of pairs of spaced parallel links 16 and 17 connected by pivot pins 18 to the arms 19 projecting axially in opposite directions from spaced clamping plates or half discs 20. The half discs 20 are mounted side by side but separated from one another by a gap 21 (Figure 2) and a conveyor flight 22 is clamped by bolts 23 between the oppositely facing pairs of clamping plates 20. The conveyor flights 22 are preferably of elastic deformable material, such as rubber or synthetic rubber. This invention is not concerned with the details of the flight conveyor 15 which is disclosed and claimed in my copending applications Ser. Nos. 605,252 and 676,546, filed July 16, 1945 and June 13, 1946 respectively. Any convenient and suitable form of flight conveyor 15 may be used in connection with this invention.

The conduits 13 and 14 are provided with annular flanges 24 secured thereto as by welding. The flanges 24 are provided with holes 25 through which pass bolts 26. The bolts 26 serve to connect the flanges 25 to flexible couplings generally designated 27 of a conventional design, the details of which form no part of the present invention.

The flexible couplings 27 consist of tubular body portions 28 having flanges 29 at their opposite ends with holes 30 for the passage of the bolts 26. The flexible couplings 27 are of elastic deformable material, such as rubber or synthetic rubber, so as to provide a resilient connection between the opposite ends of the vibrating device 11 and the conduits 13 and 14 to which it is connected. The couplings 27 intermediate their ends are provided with annular internally grooved enlargements 31 in which are mounted annular members 32.

The vibrating device 11 includes a conduit portion 33 having flanges 34 secured to its opposite ends and bolted to the adjacent flanges 29 of the flexible couplings 27 by the bolts 26 passing through holes 35 therein. The flanges 34 are secured to the conduit 33 by any suitable means, such as by welding, or they may be formed integral with the conduit 33. The conduit 33 is of approximately the same internal diameter as the conduits 13 and 14 so as to form, in effect, a continuation thereof.

The conduit 33 on its lower side between the flanges 34 is provided with a cutaway portion or opening 36, this being bridged by longitudinally arranged bars 37 extending between the edges of the cutaway portion 36. These bars 37 form a support for the flight conveyor 15 as its flights 22 pass thereover yet permit the passage of material through the spaces between them in order to discharge the material from the conveyor. Secured to the opposite sides of the conduit 33 adjacent the opening 36 are the side walls of a conduit 38 of rectangular cross-section. Bolted to the side walls of the conduit 38 are aligned flanged bearing bushings 42 having bores 43 in which is journalled the eccentric middle portion 44 of a shaft 45. The end portions 46 of the shaft 45 are journalled in the bores 47 of bearing blocks 48 which are bolted to supporting frames 50. The latter rise from and are secured as by welding to longitudinal channel members 51 which in turn rest upon and are supported by I-beams 52. The I-beams 52 are supported by suitable brackets, stanchions or pedestals (not shown) according to the particular building or place in which the conveyor system is installed.

Mounted on the end of the shaft 45 (Figure 2) and keyed or otherwise secured thereto is a pulley 53 which is encircled by a belt 54 driven by a pulley 55 mounted on the output shaft 56 of a motor 57. The motor 57 is a conventional source of power, an electric motor being shown, and is bolted to a shelf 59 extending outward from and having its inner edge secured to one of the channel members 51. The shelf 59 is in the form of a plate carried by angle members 60 connected to and extending outward from the outer flange of the channel member 51, to which the shelf 59 is attached. The angle members 60 in turn are attached to braces by upwardly inclined braces 61 of angle cross-section. The lower ends of the braces 61 are secured as by welding to longitudinal angle members 62, the upper portions of which are secured to the lower flanges of the I-beams 52.

Secured to the inner flanges of the channel members 51 are the side walls of a conduit 63 of rectangular cross-section. The conduit 63 opens into and is connected to the downwardly flaring walls of a bin top 64 leading to a bin (not shown) in which the material is to be deposited. The angle members 62 are likewise connected to the bin top 64, as by welding.

Extending inward from the inner walls of the conduit 38 are flanges 65 which surround an opening closed by a swinging gate 66 (Figure 2) mounted on a shaft 67. The shaft 67 is journalled in flanged bearing bushings 68 secured to the end walls of the conduit 38 and carries a crank 69 on one end thereof. The outer end of the crank 69 is connected by the pivot pin 70 to a head 71 on the end of an operating rod 72. The operating rod 72 is connected to a suitable hand lever (not shown) by means of which the rod 72 may be reciprocated to swing the crank 69 and thereby to swing the gate 66 into and out of the opening formed by the flanges 65.

The conduit 38 is surrounded by angle members 73 to which are bolted the flanges of flexible connectors 74 similar in construction and arrangement to the flexible connectors 27 described above, and similarly provided with an internal groove 75 having a frame-like member 76 installed therein. The lower flanges of the flexible connector 74 are bolted to the channel members 51 in such a position that the inner walls of the flexible connector 74 are substantially aligned with the inner walls of the conduits 38 and 63.

*Operation of vibrating bin loading device*

In the operation of the form of the invention shown in Figures 1 and 2, the flight conveyor 15 is started in motion through the conveyor system including the conduits 13 and 14 and the conduit portion 33 of the vibrating device 11 and material to be conveyed is supplied thereto in any conventional manner. The motor 57 is also started in operation, rotating the pulley 53 and shaft 45. The rotation of the shaft 45 and the consequent eccentric rotation of its middle portions 44 causes the bearing bushings 42 to rise and fall each revolution of the shaft 45. As the bearing bushings 42 rise and fall, the entire vibrating device connected thereto likewise rises and falls, including the conduits 33 and 38, bars 37, gate 66 and the portion of the flight conveyor 15 which at the moment is passing through the conduit portion 33 and along the bars 37. The material being pushed along by the conveyor flights 22 drops through the openings between the bars 37 and any material adhering to the conveyor 15 is dislodged by the vibration and likewise drops through the spaces between the bars 37. The vibration of the vibrating device 11 is permitted by the flexible couplings 27 and 74 by which the conduit portion 33 is connected to the conduits 13 and 14 and the conduit 38 connected to the conduit 63.

The material thus dislodged falls down through the conduit 38 and 63 past the gate 66 into the bin top 64 and thence into the bin, provided that the gate 66 is open, as shown in Figure 2. If the gate 66 is closed, the space below the rods 37 down as far as the closed gate 66 fills up with the material so that subsequent material is conveyed onward without being dumped. Thus when the flight conveyor 15 moves onward after dumping, it is comparatively clean and free from adhering material, due to the vibration of the vibrating device 11 having dislodged such adhering particles.

Vibrating bin-discharging device

The form of the invention shown in Figure 3 is substantially the same as the form of the invention shown in Figures 1 and 2 except that the vibrating device 11 is now inverted to receive the discharge from the bin 12 instead of discharging material from the conveyor into the bin 12. Accordingly, parts in Figure 3 corresponding to the same parts in Figures 1 and 2 are designated with the same reference numerals. In Figure 3, the conduit portion 33 of the vibrating device 11 receives the discharge from the bin 12 through the conduit 63 and 38 by way of the flexible connector 74, the bars 37 being omitted since the opening 36 faces upward and the conveyor flights 22 can therefore rest upon the conduit portion 33 and be guided thereby. The gate 66 in the conduit 38 of Figure 1 is omitted, and its place is taken by a gate 77 mounted on a shaft 78 journalled in at least one of the I-beams 52 and carrying on one end a crank 79 having a pivot pin 80 connecting it to a head 81 on an operating rod 82. The gate 77 is connected substantially at its midportion to the shaft 78 and its ends engage oppositely facing angle members 83 and 84 forming inwardly extending flanges in the conduit 63.

The operation of the vibrating bin-discharging device shown in Figure 3 is generally similar to that of Figures 1 and 2 just described, the difference arising from the fact that the device in Figure 3 unloads material from a bin into a flight conveyor, whereas the device shown in Figures 1 and 2 discharges material from a flight conveyor into a bin. As before, the motor 57 is started in operation, rotating the shaft 45 and causing its eccentric portion 44 to raise and lower the assembly including the conduits 33 and 38 once every revolution, and consequently vibrating the portion of the flight conveyor 15 which at that time is passing through the conduit portion 33. This action packs the material more solidly in the spaces between the conveyor flights 22, thus having the effect of tamping the material in the conveyor and thus enabling a larger volume of material to be conveyed in a given time.

Gateless self-clogging conduit with material releasing vibrator

The modification shown in Figure 4, like the forms of the invention shown in Figures 1 and 3, may be mounted either direct as shown in Figure 4 or inverted. In the direct form the device is used to receive the discharge from a conveyor and direct it into a bin. In the inverted arrangement (not shown), the device is used to receive the discharge from a bin and direct it into a flight conveyor, in a manner analogous to Figure 3.

The flight conveyor 15 in Figure 4 is substantially identical with that shown in Figures 1 and 2 and similar parts are similarly designated. The flight conveyor 15 runs in a conduit portion 85, the bottom portion of which is cut away to provide an opening 86 and longitudinal bars 87 mounted across the opening similar to the longitudinal bars 37 in Figure 2. A conduit 88 is secured to the conduit 85 and extends downward from the opening 86 and terminates in a flanged collar 87 secured thereto as by welding. A flanged flexible connector 89 similar to the flexible connectors 27 and 74 is bolted to the flanged collar 87 and also to a flanged collar 90 on the upwardly extending portion 91 of an inclined conduit 92, the lower portion 93 of which extends vertically downward to a flanged collar 94 welded or otherwise secured thereto. A flanged flexible connector 95 is bolted to the flanged collar 94 at its upper end and to a flanged collar 96 at its lower end, the flexible connector 95 being similar in construction to the flexible connectors 89, 27 and 74 previously described. The flanged collar 96 is connected to a conduit 63 leading to a bin top 64 of a bin 12 similar to that shown in Figures 1 and 2. Secured to the opposite sides of the inclined conduit 92 are flanged bearing bushings 97 which rotatably support the opposite ends of a shaft 98, the central portion 99 of which is eccentric to the shaft 98. The shaft 98 is rotatably mounted in journal boxes 100 (Figure 5) which in turn are bolted to the top members 101 of a table-like frame, generally designated 102. The frame 102 is provided with uprights 103 of channel or angle cross-section and is provided with angle cross members 104 which extend outward to support a shelf 105. Mounted on the shelf 105 is a motor 106, the shaft 107 of which carries a pulley 108 which drives a belt 109 leading to a pulley 110 mounted on the eccentric shaft 98.

In the operation of the modification shown in Figures 4 and 5, as the flight conveyor 15 conveys the material through the conduit 85 and across the bars 87 at the bottom of the opening 86, the material falls down through the spaces between the bars and through the vertical conduit portions 88 and 91 into the inclined conduit portion 92. When the motor 106 is not operating, the pitch or slope of the inclined conduit 92 is so slight that the material piles up in it and clogs the conduit 92. Thus, the material itself, by piling up in the conduit 92, serves as its own gate and no gate is necessary, like the gates 66 and 77 in Figures 2 and 3.

When it is desired to cause the material to flow downward into the bin 12, the operator starts the motor 106, thereby rotating the shaft 98 and causing its eccentric portion 99 to move the inclined conduit 92 rapidly up and down, shaking or vibrating it. This vibration causes the material to start moving downward along the inclined conduit 92, unclogging the conduit and effecting a steady flow of material into the bin 12 so long as the motor 106 is operating. When it is desired to halt the flow of material the motor 106 is halted, whereupon the material again clogs the inclined conduit 92.

Vibrating chain-clearing device adjacent sprocket

The modification shown in Figures 6 and 7 employs a vibrating device, generally designated 11, to dislodge the particles of material which might otherwise adhere to the flight conveyor 15 and interfere with the engagement thereof with the sprocket 110 around which the flight conveyor 15 passes. The vibrating device 11 of Figures 6 and 7 is similar to that of Figures 1 and 2 and similar parts are therefore designated with the same reference numerals and hence require no further description. The T-shaped conduit 33, together with the eccentric vibrating shaft 45, is mounted in a hopper 111 with a discharge spout or opening 112. The vibrating shaft 45 is journalled in the side walls of the hopper 111 and is connected by the belt 54 to the pulley 55 on the shaft 56 of a motor 57 as in Figure 1. The conduit portions 13 and 14, as before, are connected to the conduit portion 33 by flexible connectors 27 of elastic deformable material so that the vibrating device 11 may oscillate independently of the conduit portions 13 and 14.

The vibrating device 11 in Figures 6 and 7 is shown as applied to both courses of the conveyor 10 adjacent the sprocket 110, but it is obvious that the device may be applied to one course only, as shown in Figure 2. In the arrangement shown in Figures 6 and 7, the motor 57 is mounted on the top wall 113 of the hopper 111 and is covered by a hood 114. The motor shaft 56 carries an additional pulley 115 which drives a belt 116 that in turn drives a pulley 117 upon a shaft 118. The shaft 118 enters and drives a reduction gearing unit 119, the output shaft 120 of which carries the sprocket 110. The reduction gearing unit 119 is conventional and is provided with a movable mounting (not shown) of conventional design for providing a shifting of the sprocket 110 in order to take up slack in the flight conveyor 15. The sprocket driving and take-up mechanism is conventional and its details form no part of the present invention. The conduit portions 14 terminate adjacent the sprocket 110 so that the flight conveyor 15 emerges therefrom before it encircles the sprocket 110.

In the operation of the modification shown in Figures 6 and 7, the motor 57 is started in operation and rotates the drive sprocket 110 to cause the flight conveyor 15 to follow its circuitous path through the conduit system. At the same time, the simultaneous rotation of the eccentric shaft 45 causes the vibrating device 11 to oscillate within the hopper 111, dislodging particles of material from the conveyor chain 15 as it passes through the conduit portion 33. The dislodged particles fall between the bars 37 and down through the conduits 38 into the hopper 111. Since the latter has inclined walls, the dislodged material slides down these walls and out through the spout 112 into any suitable receptacle.

Thus, by the arrangement shown in Figures 6 and 7, the vibrating device shakes the conduits 33, 38, the conveyor passing therethrough and the material itself so as to dislodge the particles of material from both the conveyor and the conduit. If both courses of the conduit are vibrated on opposite sides of the sprocket 110, any particles of the material adhering to the conveyor after emerging from one conduit will tend to become dislodged when it is vibrated for the second time in the return course of the conveyor after it has passed around the sprocket 110. The major portion of the particles, of course, will be dislodged by the first vibration and hence wear on the sprocket 110 and its adjacent mechanism resulting from such particles will be considerably reduced. Due to the offcenter mounting of the conveyor flights 22 on the chain links 16, 17 (Figures 1 and 2), the outer edges of adjacent flights 22 will move apart from one another out of parallelism as the chain passes around the sprocket 110 (Figure 6), this spreading effect of the eccentrically mounted flights giving a further dislodging effect upon the material being conveyed.

While the vibrating device is shown as applied to conduits of circular cross-section, it will be evident that it may be equally well applied to the vibration of conduits of any desired cross-section such as, for example, to flight conveyors with rectangular flights traveling in conduits of rectangular cross-section.

While I have shown and described my invention in detail, it is to be understood that the same is to be limited only by the appended claims, for many changes may be made without departing from the spirit and scope of my invention.

What I claim is:

1. A material removing device for a flight conveyor traversing a conduit system having a pair of stationary conduits disposed with ends adjacent one another in spaced relationship with a gap therebetween, said device comprising a movable conduit movably mounted in said gap in said conduit system and disposed in communication therewith, flexible couplings connecting said movable conduit to said adjacent ends of said stationary conduits, conduit-vibrating mechanism engageable with said movable conduit to vibrate the same bodily relatively to said stationary conduits, and a power source drivingly connected to said vibrating mechanism.

2. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, conduit-vibrating mechanism engageable with said movable conduit to vibrate the same bodily relatively to said stationary conduits, a power source drivingly connected to said vibrating mechanism, and a flexible coupling interposed between said movable conduit and said conduit system.

3. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, conduit-vibrating mechanism engageable with said movable conduit to vibrate the same bodily relatively to said stationary conduits, a power source drivingly connected to said vibrating mechanism, and a flexible coupling interposed between said movable conduit and said conduit system at each end of said movable conduit.

4. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, conduit-vibrating mechanism engageable with said movable conduit to vibrate the same bodily relatively to said stationary conduits, a power source drivingly connected to said vibrating mechanism, and a flexible coupling of elastic deformable material interposed between said movable conduit and said conduit system.

5. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism including a support and an oscillatable member mounted on said support and engageable with said movable conduit to vibrate the same bodily relatively to said stationary conduits, and a power source drivingly connected to said vibrating mechanism.

6. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism including a support and a rotatable eccentric member journaled in said support and engageable with said movable conduit to vibrate the same bodily relatively to said stationary conduits, and a power source drivingly connected to said vibrating mechanism.

7. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism including a support, a rotary shaft journalled in said support, an oscillatable member operatively connected to said shaft and responsive to the rotation thereof to vibratingly engage and oscillate said movable conduit bodily relatively to said stationary conduits, and a power source drivingly connected to said shaft.

8. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism including a support and an oscillatable member mounted on said support and engageable with said movable conduit to vibrate the same bodily relatively to said stationary conduits, a power source drivingly connected to said vibrating mechanism, and a flexible connector interposed between said movable conduit and said conduit system.

9. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism including a support and a rotatable eccentric member journalled in said support and engageable with said movable conduit to vibrate the same bodily relatively to said stationary conduits, a power source drivingly connected to said vibrating mechanism, and a flexible connector interposed between said movable conduit and said conduit system.

10. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism including a support, a rotary shaft journalled in said support, an oscillatable member operatively connected to said shaft and responsive to the rotation thereof to vibratingly engage and oscillate said movable conduit bodily relatively to said stationary conduits, a power source drivingly connected to said shaft, and a flexible connector interposed between said movable conduit and said conduit system.

11. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism engageable with said movable conduit to vibrate the same bodily relatively to said stationary conduits, and a power source drivingly connected to said vibrating mechanism, said movable conduit having a discharge aperture therein with a guide member disposed lengthwise thereof across said discharge aperture and guidingly engaged by said flight conveyor.

12. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism including a support and an oscillatable member mounted on said support and engageable with said movable conduit to vibrate the same bodily relatively to said stationary conduits, and a power source drivingly connected to said vibrating mechanism, said movable conduit having a discharge aperture therein with a guide member disposed lengthwise thereof across said discharge aperture and guidingly engaged by said flight conveyor.

13. A material removing device for a flight conveyor traversing a conduit system having a pair of stationary conduits disposed with ends adjacent one another in spaced relationship with a gap therebetween, said device comprising a movable conduit movably mounted in said gap in said conduit system and traversed by said flight conveyor, flexible couplings connecting said movable conduit to said adjacent ends of said stationary conduits, conduit-vibrating mechanism including a support and a rotatable eccentric member journalled in said support and engageable with said movable conduit to vibrate the same bodily relatively to said stationary conduits, and a power source drivingly connected to said vibrating mechanism, said movable conduit having a discharge aperture therein with a guide member disposed lengthwise thereof across said discharge aperture and guidingly engaged by said flight conveyor.

14. A material removing device for a conduit system having a pair of stationary conduits disposed with ends adjacent one another in spaced relationship with a gap therebetween and a flight conveyor traversing said conduit system and passing around guiding or driving wheels, said device comprising a movable conduit movably mounted in said gap in said conduit system and disposed in communication therewith, said movable conduit being disposed adjacent one of said wheels and traversed by said flight conveyor, flexible couplings connecting said movable conduit to said adjacent ends of said stationary conduits, a vibratable element engageable with said movable conduit, vibrating mechanism engageable with said vibratable element, and a power source drivingly connected to said vibrating mechanism.

15. A material removing device for a conduit system having two pairs of stationary conduits disposed with the ends of each pair adjacent one another in spaced relationship with a gap between each pair of stationary conduits, and a flight conveyor traversing said conduit system and passing around guiding or driving wheels, said device comprising a pair of movable conduits movably mounted in said gaps in said conduit system and disposed in communication therewith, flexible couplings connecting said movable conduits to the adjacent ends of their respective stationary conduits, said pair of movable conduits being mounted adjacent to and on opposite sides of one of said wheels and traversed by said flight conveyor before and after its engagement with said one wheel, a vibratable element engageable with said flexible member adjacent one of said wheels, vibrating mechanism engageable with said vibratable element, and a power source drivingly connected to said vibrating mechanism.

HENRY W. HAPMAN.

REFERENCES CITED

The following references are of record in the file of this patent:

UNITED STATES PATENTS

| Number | Name | Date |
| --- | --- | --- |
| 806,892 | Helgerson | Dec. 12, 1905 |
| 1,377,399 | Conte | May 10, 1921 |
| 1,843,042 | Nyborg | Jan. 26, 1932 |
| 1,991,887 | Elmer | Feb. 19, 1935 |
| 2,383,932 | Brunner | Sept. 4, 1945 |
| 2,416,553 | Vaughan | Feb. 25, 1947 |
| 2,547,462 | Hapman | Apr. 3, 1951 |